United States Patent [19]

Jester

[11] Patent Number: 4,681,723

[45] Date of Patent: Jul. 21, 1987

[54] CALENDER BAND STRIPPING SECTION AND PROCESS FOR STRIPPING CALENDERED SHEET

[75] Inventor: Randy D. Jester, Greer, S.C.

[73] Assignee: American Hoechst Corporation, Somerville, N.J.

[21] Appl. No.: 794,347

[22] Filed: Nov. 1, 1985

[51] Int. Cl.<sup>4</sup> .............................................. B29C 43/24
[52] U.S. Cl. .................................... 264/175; 264/216; 264/237; 264/284; 425/363; 425/373
[58] Field of Search ............... 264/175, 284, 216, 237; 425/363, 373, 194

[56] References Cited

U.S. PATENT DOCUMENTS

| 2,585,915 | 2/1952 | Chavannes | 264/284 |
| 2,970,345 | 2/1961 | Wangner, Jr. | 264/284 |
| 3,246,365 | 4/1966 | Kloender | 264/284 |
| 3,346,913 | 10/1967 | Lake et al. | 425/194 |
| 3,964,848 | 6/1976 | Wockener | 264/175 |
| 4,408,974 | 10/1983 | Comerio | 425/194 |

FOREIGN PATENT DOCUMENTS

| 586366 | 11/1959 | Canada | 264/284 |
| 1207610 | 12/1965 | Fed. Rep. of Germany | 425/363 |
| 54-65764 | 5/1979 | Japan | 425/363 |
| 55-158924 | 12/1980 | Japan | 264/216 |
| 56-62122 | 5/1981 | Japan | 264/216 |
| 0887229 | 12/1981 | U.S.S.R. | 264/175 |

Primary Examiner—Jeffery Thurlow
Attorney, Agent, or Firm—James C. Lydon

[57] ABSTRACT

An improved apparatus and method for calendering of thermoplastic material are disclosed. An endless belt is interposed between the calendered material and the last calender roll which belt conveys the thermoplastic calendered sheet around the last calender roll and toward the stripper roll. The thermoplastic calendered sheet does not come into contact with the final calender roll surface. After cooling the film should strip easily off the endless belt. Consequently, problems originating in sheet adhesion to the final calender roll will be reduced if not eliminated.

10 Claims, 8 Drawing Figures

CALENDER BAND STRIPPING SECTION AND PROCESS FOR STRIPPING CALENDERED SHEET

BACKGROUND

This invention relates to the art of calendering thermoplastic materials into sheet-like form. More particularly, the present invention relates to an improved method and apparatus for removing the hot thermoplastic material from the calender.

Calendering of thermoplastic materials into film or sheet-like form is well known, and may be briefly described in relation to the manufacture of unplasticized ("rigid") polyvinyl chloride sheet. The PVC formulation—which generally comprises PVC resin, an impact modifier, a thermal stabilizer, one or more lubricants for "internal" and "external" lubrication, and pigments as well as various other processing additives—is mixed to distribute the additives throughout the PVC resin. Mixing may be accomplished using either large bulk mixers such as ribbon blenders or high speed mixers. The blended PVC formulation is then fluxed into one of several possible forms including small strands, chunks, and continuous ribbons. Typically, the fused PVC formulation is then passed between at least one set of mixing rolls—normally operated at from about 170° to about 180° C.—which serves to convert the fluxed PVC formulation into a relatively narrow, thick strip of material which is then passed to the calender by a conveyor.

Calenders are well known to those in the art and may be described as a series of rotating cooperating rollers or bands between Which is forced a thermoplastic material which, due to the action of the calender, assumes the shape of a sheet, film or web of specified width and thickness. Rigid PVC calenders usually consist of four rolls, although both three and five roll calenders are known. The surface of the formed sheet, film or web may be smooth or matte, depending on the finish of the final two calender rolls. As indicated above, there is a great variety possible in the number and configuration of rolls in a calender train. Those of ordinary skill in the calender arts will be familar with 2-roll, 3-roll, 4-roll or 5-roll types, which can be arranged for example in 2-roll vertical, 2-roll inclined, 2-roll horizontal, 3-roll vertical, 3-roll 120°, 3-roll inverted "L", 3-roll triangular, 4-roll stack, 4-roll "L", 4-roll inverted "L", 4-roll flat "Z", 4-roll inclined "Z", 4-roll vertical "Z", or 5-roll "L" configurations. For the processing of thermoplastics, particularly rigid PVC, the most commonly used calenders are the 4 - or 5-roll "L" or inverted "L" types, or the 4-roll inclined "Z" type (also known as an "S" calender).

The calendered PVC sheet is typically removed from the last roll of the calender by two to four stripper rolls, passed over two to six cooling drums, scanned by a beta ray gauge measuring device, cut by an edge trimming system and finally wound or stacked.

Embossing units are sometimes used in the manufacture of rigid PVC sheet, especially matte-finish products. An embossing unit typically comprises a rubber nip roll running against a patterned or matte finish steel roll.

Rigid PVC calenders typically operate from about 180° to 200° C. The object is to process the PVC formulation as quickly as possible through the calender line before it decomposes or sticks to the calender rolls. Unfortunately, adhesion of hot PVC to the last calender roll at the point it is stripped off the roll remains a problem. Some of the design and processing variables which affect the degree of adhesion are calender roll temperature, roll surface, the PVC formulation, plastic draw, and the design of the stripping section. Unfortunately, minimizing film adhesion by lowering roll temperature, using gloss calender rolls, and employing high draw ratios between the calender and the stripping rolls may lead to a commercially unacceptable PVC product. For example, low roll temperatures increase haze in transparent films and may cause other processing problems. High draw ratios between the calender and the stripping roll may create machine direction shrinkage in the film and increase gauge profile variations. In short, the basic problem in typical calendering operations is to remove the hot calendered thermoplastic sheet from the last calender roll and cool it without disturbing its lay-flat, gauge profile, surface characteristics or shrinkage properties.

These properties, especially lay-flat or curl resistance, and low levels of shrinkage generally, have become increasingly important in certain applications of calendered plastic materials. For example, calendered polyvinyl chloride is used to manufacture floppy disk jackets and also in blister packaging. Floppy disk jacket applications have increasingly demanded PVC sheets which will not curl or wrinkle upon exposure to temperatures up to about 160° F. Blister packaging thermoformers require a shrinkage resistant film which will not curl in machines which do not restrain the film edges during heating. PVC resin which has been calendered tends to stick to the last roll of the calender and must be pulled off the roll. This tends to impart machine direction thermal shrinkage in the PVC sheet, rendering the film unattractive for floppy disk jacket and blister packaging applications.

One solution to this problem is proposed by F. Nicoll, "Manufacture of Continuous Plastic Sheets," U.S. Pat. No. 4,311,658 (Jan. 19, 1982), which is expressly incorporated by reference in its entirety. Nicoll '658 discloses rotation of the stripper rolls in the same direction as the direction of rotation of the last calender roll in order to minimize problems associated with the release of the hot PVC resin from the last calender roll, including the problem of surface uniformity in matte sheet manufacture and the problem of residual strain in general. Nicoll '658 does not directly address the problems associated with an unstable "stripping line", however.

The tendency of the hot calendered PVC film to stick to the last calender roll can result in a non-linear and/or a fluctuating "stripping line," which is the line across the last calender roll formed by the last point of film contact. A stable, linear stripping line is critical to production of high quality calendered film. A curved stripping line generally imparts a tendency to curl to the calendered film. A fluctuating stripping line caused by sporadic sticking of the film generally imparts web shrinkage variability to the film. The present invention should substantiallY eliminate the need for production personnel to constantly monitor the "stripping line" of the calendered film to ensure that it is stable.

SUMMARY OF THE INVENTION:

The present invention relates to an apparatus for the manufacture of a continuous sheet or film of thermoplastic material consisting essentially of a plurality of calender rolls in coeperating relationship, at least one stripper roll, means for imparting rotational movement to said calender rolls and said stripper roll whereby the last calender roll is operated at the same or greater rotational speed than the preceding calender roll, an endless belt which is in close contact with and travels around said stripper roll and the last of said calender rolls, and means for continously removing calendered material from said endless belt in the vicinity of said stripper roll.

In another aspect, the present invention is a process for the manufacture of a continuous sheet or film of thermoplastic material consisting essentially of heating a thermoplastic material to a thermoplastic state;

forming said thermoplastic material into a flexible sheet or film by means of a calender having a plurality of rolls, the last of which is in close contact with an endless belt which travels around said calender roll and which endless belt is in close contact and travels around a stripper roll;

removing said flexible sheet from said calender by contacting said flexible sheet with said endless belt rather than the last roll of the calender and conveying said flexible sheet away from the calender;

continously cooling said flexible sheet; and continously removing said cooled flexible sheet from said endless belt.

BRIEF DESCRIPTION OF THE DRAWINGS

The accompanying drawings are diagrammatic side elevations of calender and associated stripper roll assemblies, in accordance with the prior art and in accordance with the present invention. It will be understood that those drawings which depict, in schematic form, apparatus according to this invention are intended only to be illustrative thereof and not limitative thereof.

DETAILED DESCRIPTION OF THE INVENTION

Figure 1:
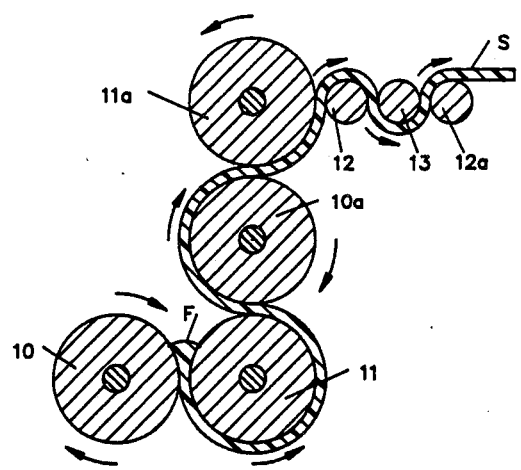
FIG. 1 represents a bottom-fed "L" calender, with three stripper rolls according to the prior art.

Although the method and apparatus of this invention are believed particularly useful in calendering polyvinyl chloride (PVC), and its use will be exemplified in connection therewith, the scope of the invention is not limited thereto and embraces the calendering of any material which is capable of being calendered, including such thermoplastic materials as ABS, cellulose acetate, cellulose butyrate, cellulose propionate, ethylene/ethyl acrylate copolymers, alloys of PVC and acrylate ester polymers, chlorinated PVC, polyolefins, and so forth. As uSed herein, the term "pVC" includes vinyl chloride homopolymers, copolymers and terpolymers, both plasticized and unplasticized, and compounds thereof containing any of the conventional additives such as impact modifiers, stabilizers, lubricants, fillers, colorants, and so on.

As summarized above, the present invention relates to an apparatus and method for stripping hot, tacky calendered material from a calender by means of an endless belt traveling around the last calender roll and at least one stripper roll. It is believed the present invention permits efficient stripping of the calendered material without significantly affecting the shrinkage properties of the calendered material.

The calender rolls employed in the present invention are conventional in nature. Such rolls are typically manufactured from either chilled cast iron or forged steel, with forged steel rolls predominating for calenders over two meters wide due to the higher modulus of forged steel, which is important in controlling roll deflection. The surface of calender rolls used to produce "gloss" film (smooth, clear product) must have a surface finish or rating of RMS-1; such rolls are typically chrome plated. By contrast, unchromed rolls are typically employed to produce "matte" finish products.

The physical form and size of the stripper rolls to be used in the practice of this invention will not differ in any significant manner from conventional stripper rolls. Thus they will generally be made of a ferrous metal, and may advantageously be chrome plated. The surface can be smooth or matte, can be sand blasted, chemically etched, metal sprayed, Teflon ® coated, and so on, in known manner. In the case of plasticized PVC it is sometimes advantageous to cover the stripper rolls with a felt or a textile fabric. The material of construction of the stripper roll and the surface treatment thereof is not a part of the invention. The diameter of the stripper rolls is not critical. A diameter in the range of from about 4 inches to about 10 inches is generally satisfactory, but smaller or greater diameters can be used if desired without departing from the scope of the invention. As will be obvious to those skilled in the art, the width of the stripper rolls will be determined by the width of the calender with which they are to be used.

Similarly, the means for imparting rotational movement to the calender rolls and the stripper rolls will be conventional in nature. All the rolls in a typical calender may be individually speed controlled. Normally each roll is run slightly faster than the preceding roll since a hot sheet will "follow" the faster running roll, and thus sheet transfer between rolls is enhanced. Calender rolls are usually driven by DC motors operating through reduction gears. The speed differential or friction between each calender roll pair is normally from 0 to 30%. Calender roll speeds can range up to 100 meters per minute on the final roll. Stripper rolls are also driven by DC motors operating through reduction gears. Stripper rolls typically rotate at least the speed of the final calender roll and generally somewhat faster in order to strip or remove the hot calendered material from the last calender roll. Conventional stripper roll speeds can range up to four times the speed of the final calender roll. In the practice of the present invention, the rotational speed of the first stripper roll must be substantially the same as the rotational speed of the final calender roll in the present invention since an endless band travels around both rolls.

The endless band of the present invention must be flexible, capable of efficent heat transfer, not be subject to significant elongation or shrinkage, and must have good tensile strength. Stainless steel, polyimide film, and polyethylene terephthalate film all may be used to fabricate the endless belt of the present invention, with stainless steel being preferred for commercial production calenders. Metallic bands formed from beryllium/copper alloy, copper/cobalt/beryllium alloy, or copper/nickel/beryllium alloys may have utility as the endless band. Endless belts formed from such alloys are described in U.S. Pat. No. 4,537,810, which is expressly incorporated by reference in its entirety.

Polymeric films produced from polyaryl ether ketones and/or polyaryl ether sulfones may also have utility as the endless band; such polymers are described in U.S. Pat. Nos. 3,442,857 3,441,538, and 3,751,398, each of which is expressly incorporated by reference in its entirety.

The purpose and function of the endless belt is to supplant the working surface of the last calender roll. Rather than contacting the surface of the final calender roll, the hot tacky thermoplastic resin will come into contact with the surface of the endless belt, be carried partially around the final roll, and toward the stripper roll by the endless belt. Since there will be no contact with the final calender roll, the problem of excessive film adhesion to the calender roll with its attendant deliterious effects upon the film's mechanical properties, especially shrinkage and elongation, should be obviated. As the hot tacky film is carried away from the final calender roll it will begin to cool under the influence of the cooling means described below, thereby losing some of its adhesive property. This will permit efficient stripping of the calendered sheet from the endless band without influencing the sheet's mechanical properties.

"The last calender roll," as used herein and in the claims, is defined as the last calender roll which the calendered material is carried upon prior to removal from the calender. In some calenders, such as the bottom-fed "L" calender depicted in FIG. 1, the top-fed inverted "L" calender depicted in FIG. 2, and the bottom-fed inclined "Z" calender depicted in FIG. 4, the last roll on the calender is actually the last roll which the calendered material is carried upon prior to the removal from the calender. In other calender configurations, this is not the case. FIG. 3 depicts a top-fed calender in which calendered material is removed from the third calender roll as opposed to the fourth and final calender roll.

The working surface of the endless belt (ie. that surface which comes into contact with the calendered thermoplastic material) may be smooth in order to produce "gloss" or smooth calendered sheet, or it may be roughened or patterned in order to produce calendered sheet having a "matte" finish.

As the endless belt travels away from the last calender roll and toward the stripper roll, the belt and the hot calendered sheet supported by the belt are cooled. This may be accomplished by running the endless belt over cooling pipes or by blowing cooling air against the belt or the calendered sheet. Alternatively, cooling may be accomplished by merely exposing the belt and the hot calendered sheet to ambient air. As the calendered sheet cools it will become less tacky and less adhesive, thereby enabling removal of the calendered sheet from the endless belt without significantly affecting its lay-flat, gauge profile, surface characteristics or shrinkage properties.

The calendered sheet may be conveniently removed from the endless belt in the vicinity of the first stripper roll, and more specifically in the zone where the endless belt makes contact with the stripper roll and begins to travel around the roll and back towards the final calender roll. Stripping of the calendered sheet may be performed using conventional equipment in much the same manner that calendered material is stripped from the final calender roll by a stripper roll or rolls.

The invention may be further illustrated by examination of the drawings. As discussed above, FIGS. 1 through 4 depict conventional calender configurations and stripping sections. Such apparatus would typically be operated in combination with PVC resin blenders, fluxers, mixing rolls, cooling drums, trimming systems and winders, all of which are conventional and not shown in the drawings. Referring to FIG. 1, a bottom-fed "L" calender is diagrammatically depicted with three stripper rolls. The calender comprises four calender rolls 10, 11, 10(a) and 11(a) and rotational means therefor (not shown). As depicted by the arrows indicating the direction of individual rotation, calender rolls 10 and 10(a) rotate clockwise, while calender rolls 11 and 11(a) rotate counter-clockwise. The stripper section comprises stripper rolls 12, 13, and 12(a) and rotational means therefor (not shown). As depicted by the arrows indicating the direction of individual rotation, stripper rolls, 12 and 12(a) rotate clockwise, while stripper roll 13 rotates counter-clockwise.

In conventional operation, the fluxed thermoplastic resin is fed to the first nip of the calender formed by rotating calender rolls 10 and 11. A first bank of thermoplastic resin is formed in this nip. The thermoplastic resin is forced between calender rolls 10 and 11, thereby adopting a sheet-like form. The calendered thermoplastic sheet adheres to calender roll 11 and is carried by rotation of same to the nip between calender rolls 11 and 10(a). A second, smaller bank of thermoplastic resin is formed in the second nip. The thermoplastic resin is forced between calender rolls 11 and 10(a), thereby adopting a thinner, sheet-like form than the calendered thermoplastic sheet emerging from the nip formed by calender rolls 10 and 11. The twice-calendered sheet adheres to calender roll 10(a) and is carried by rotation of same to the nip formed by calender rolls 10(a) and 11(a). A third, still smaller bank of thermoplastic resin may form in this third nip. The thermoplastic resin is forced between calender rolls 10(a) and 11(a), thereby adopting yet a thinner, sheet-like form than the calendered thermoplastic sheet emerging from the second nip of the calender apparatus. The thrice-calendered adheres to calender roll 11(a) and is carried by rotation of same partially around calender roll 11(a). The thrice-calendered resin is then removed from the working surface of calender roll 11(a) by the action of the stripping rolls 12, 13 and 12(a). The calendered sheet travels around these rolls to slitting and winding means not shown in FIG. 1.

In the conventional calendering process just described the thermoplastic material becomes progressively hotter and more adhesive with each passage through a calender nip. By the time the calendered material is forced through the nip formed by calender rolls 10(a) and 11(a), it is hot and adheres strongly to calender roll 11(a) (the "last calender roll"). Removal of the adhesive calendered sheet from calender roll 11(a) requires force to be exerted by the stripper rolls, and may impart undesirable orientation to the otherwise unoriented calendered sheet, especially if an undesirable "stripping line" is created.

Figure 5:
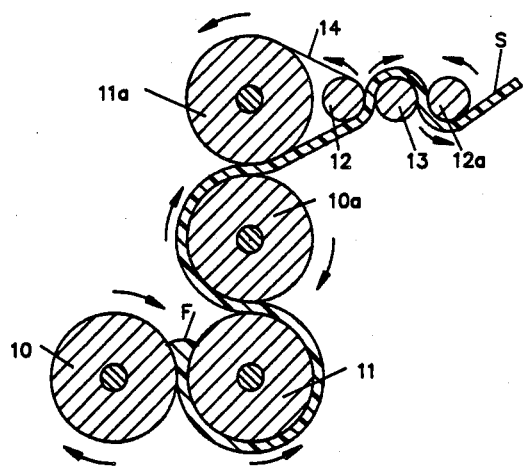
FIG. 5 depicts a bottom-fed "L" calender, with an endless belt in close contact with the last calender roll and the first stripper roll, in accordance with the present invention.

The present invention modifies the above-described bottom-fed "L" calender and calendering process in the manner illustrated by FIG. 5, which depicts the same calender apparatus modified by the addition of an endless band 14 which travels around calender roll 11(a) and stripper roll 12. This requires that stripper roll 12 rotate counter-clockwise, as does calender roll 11(a). Consequently, stripper roll 13 rotates clockwise and stripper 12(a) rotates counter-clockwise.

In operation, the thermoplastic resin will be fed to the calender in conventional manner. The thermoplastic resin will be forced through the first and second nips of the calender in similar fashion to the conventional process. As the thermoplastic resin adheres to calender 10(a) it will be carried to, and forced between, a nip formed by calender roll 10(a) and the working surface of endless band 14. The thermoplastic resin will thereby adopt a thinner sheet-like form and adhere to the endless belt, which will carry it towards stripper roll 12.

During the calendering process just described, the thermoplastic resin will become progressively hotter and more adhesive with each passage through a calender nip. In a manner analogous to the conventional process described above, thermoplastic resin which is calendered according to the process and apparatus illustrated by FIG. 5 will emerge from the last nip (formed by calender roll 10(a) and the working surface of endless band 14) in a hot, adhesive state. As the endless band 14 carries the calendered sheet toward stripper roll 12, the sheet will begin to cool and become less adhesive.

As the cooled thermoplastic calendered sheet reaches stripper roll 12 and is carried partially around same by the endless belt 14, the calendered sheet will be efficiently removed from the endless belt by stripper roll 13. Since the calendered sheet will be relatively cool, it should be more resistant to orientation caused by the pulling force of stripper roll 13.

Figure 2:
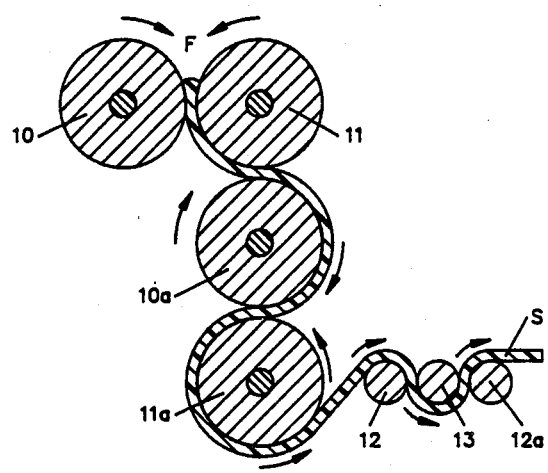
FIG. 2 represents a top-fed inverted "L" calender, with three stripper rolls according to the prior art.
Figure 3:
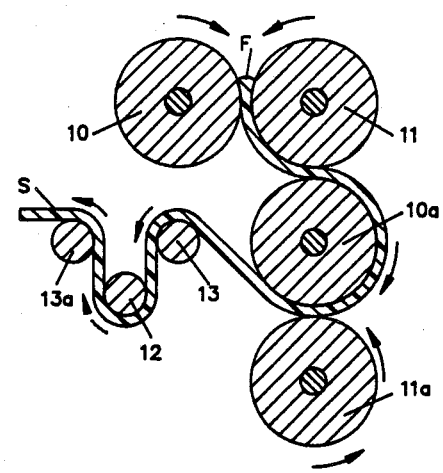
FIG. 3 represents a top-fed "F" calender, with three stripper rolls according to the prior art.
Figure 4:
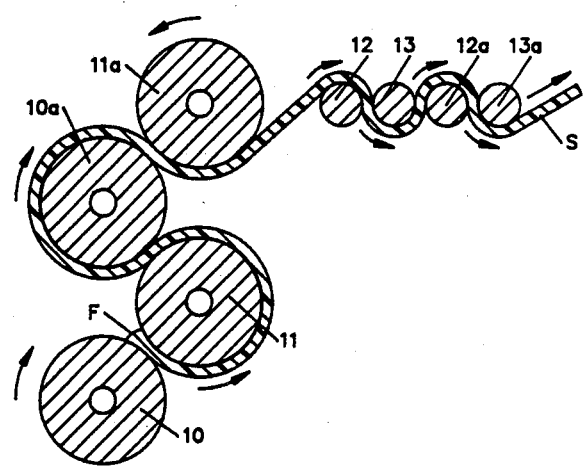
FIG. 4 represents a bottom-fed inclined "Z" calender, with four stripper rolls according to the prior art.
Figure 8:
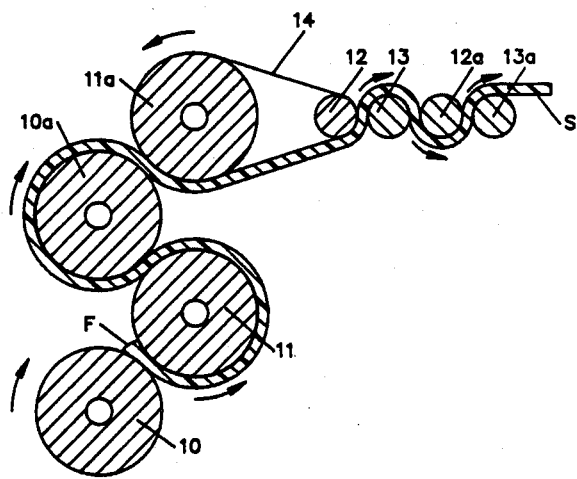
FIG. 8 represents a bottom-fed inclined "Z" calender, with an endless belt in close contact with the last calender roll and the first stripper roll, in accordance with the present invention.

FIGS. 2 through 4 are analogous to FIG. 1 and illustrate various conventional calender configurations. Similarly, FIGS. 6 and 8 are analogous to FIG. 5, and depict how the present invention would modify these calender configurations.

DESCRIPTION OF THE PREFERRED EMBODIMENT

The present invention may be employed upon a wide variety of calenders in the production of a wide range of thermoplastic materials. The use of the invention as applied to a four-roll, top-fed, inverted "L" calender for the production of unplasticized polyvinyl chloride sheet is a preferred embodiment of the invention.

Figure 6:
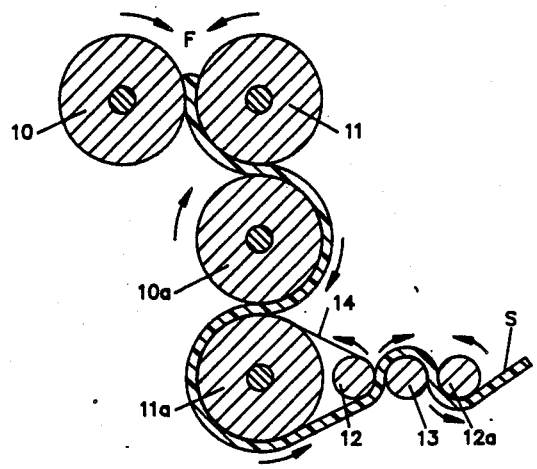
FIG. 6 depicts a top-fed inverted "L" calender with an endless belt in close contact with the last calender roll and the first stripper roll, in accordance with the present invention.
Figure 7:
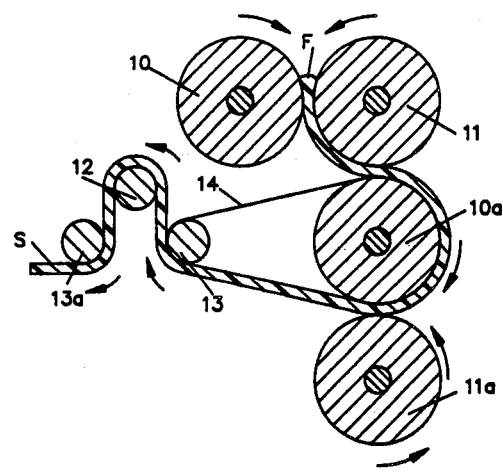
FIG. 7 illustrates a top-fed "F" calender with an endless belt in close contact with the last calender roll and the first stripper roll, in accordance with the present invention.

The preferred embodiment of the invention is illustrated in FIG. 6, which depicts endless belt 14 in close contact with the last calender roll [roll number 11(a)] and the first stripper roll 12. In operation, thermoplastic PVC F will be fed to the first nip of the calender. A first bank of thermoplastic PVC will form in the nip. The thermoplastic PVC will be forced between calender rolls 10 and 11 thereby adopting a sheet-like form. The calendered thermoplastic PVC sheet will then "follow" calender 11 to the nip between calender roll 11 and calender roll 10(a). A second bank of thermoplastic PVC will be formed in the second nip. The thermoplastic PVC will be forced between calender rolls 11 and 10(a), thereby adopting a thinner sheet-like configuration than the calendered PVC sheet emerging from calender rolls 10 and 11. The twice calendered thermoplastic sheet will "follow" calender roll 10(a) to the nip between calender roll 10(a) and the endless belt 14 which will travel around calender roll 11(a). A third bank of thermoplastic PVC may be formed in the third nip. The twice calendered thermoplastic PVC will be forced between the calender roll 10(a) and the endless belt, thereby forcing the thermoplastic material to adopt an even thinner sheet-like form. The thrice calendered PVC sheet, which will be hot (typically above 140° C.) and tacky, will adhere to the endless belt as the belt travels around calender roll 11(a), leaves the roll surface, and travels toward the first stripper roll 12. As the calendered PVC is carried toward the first stripper roll by the endless belt, the calendered PVC will begin to cool under the influence of ambient air. As the PVC sheet cools, it will become less tacky and adhesive, thereby permitting the PVC sheet to be stripped or removed from the endless belt 14 as it reaches and begins to travel around the first stripper roll 12 without degrading the mechanical properties of the calendered PVC sheet. The endless roll, now free of the PVC sheet, will travel around the first stripper roll back towards calender roll 11(a). The cooled and stripped PVC sheet may then travel over several more rolls prior to stacking or winding.

One of ordinary skill in the art will recognize that the above described invention should significantly enhance the desirable properties of calendered film, such as lay flat and shrinkage resistance, thereby permitting wider commercial acceptance of calendered thermoplastics for floppy disk jacket and blister packaging applications. Additionally, the problem associated with an unstable "stripping line" should be reduced if not eliminated.

I claim:

1. An apparatus for the manufacture of a continuous sheet of thermoplastic material consisting essentially of:
   a plurality of calender rolls in cooperating relationship;
   at least one stripper roll;
   means for imparting rotational movement to said calender rolls and stripper roll, whereby the last calender roll is operated at the same or greater rotational speed than the preceding calender roll, and
   an inelastic, flexible, endless belt, capable of efficient heat transfer, which is in close contact with and travels around said stripper roll and the last of said calender rolls, and
   means for removing a continuous sheet of thermoplastic material from the endless belt in the vicinity of said stripper roll.

2. The apparatus of claim 1 wherein said endless belt is fabricated from a material selected from the group consisting of stainless steel, beryllium/copper alloy, copper/cobalt/beryllium alloy, copper/nickel/beryllium alloy, polyarylether ketone, polyarylether sulfone, polyimide, and polyester.

3. The apparatus of claim 1 wherein the working surface of said endless belt has a minimum surface smoothness rating of RMS-1.

4. The apparatus of claim 1 wherein the working surface of said endless belt is designed to impart a matte finish to the continuous sheet.

5. The apparatus of claim 1 wherein there are four calender rolls.

6. A process for the manufacture of a continuous sheet of thermoplastic material consisting essentially of:
   (i) heating a thermoplastic material to a thermoplastic state;
   (ii) forming said thermoelastic material into a flexible, continuous sheet by means of a calender having a plurality of rolls, with the last calender roll in close contact with an inelastic, flexible, endless belt capable of efficient heat transfer which travels around said calender roll and which endless belt is in also close contact with and travels around a stripper roll;
   (iii) removing said flexible sheet from said calender by contacting said flexible sheet with said endless belt, rather than the last roll of the calender, and conveying said flexible sheet away from the calender and towards said stripper roll;
   (iv) continuously cooling said flexible sheet;
   (v) removing said cooled flexible sheet from said endless belt.

7. The process of claim 6 wherein said endless belt is fabricated from a material selected from the group consisting of stainless steel, beryllium/copper alloy, copper/cobalt/beryllium alloy, copper/nickel/beryllium alloy, polyarylether ketone, polyarylether sulfone, polyimide, and polyester.

8. The process of claim 6 wherein the working surface of said endless belt has a minimum surface smootheners of RMS-1.

9. The process of claim 6 wherein the working surface of said endless belt is designed to impart a matte finish to the continuous sheet.

10. The process of claim 6 wherein a four roll calender is employed.

* * * * *